US012094645B2

(12) United States Patent
Nasu

(10) Patent No.: US 12,094,645 B2
(45) Date of Patent: Sep. 17, 2024

(54) ANTENNA COUPLING ELEMENT, ANTENNA DEVICE, AND COMMUNICATION TERMINAL DEVICE

(71) Applicant: Murata Manufacturing Co., Ltd., Nagaokakyo (JP)

(72) Inventor: Takafumi Nasu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 397 days.

(21) Appl. No.: 16/992,193

(22) Filed: Aug. 13, 2020

(65) Prior Publication Data

US 2020/0373083 A1 Nov. 26, 2020

Related U.S. Application Data

(63) Continuation of application No. PCT/JP2019/016120, filed on Apr. 15, 2019.

(30) Foreign Application Priority Data

Apr. 25, 2018 (JP) ................................ 2018-084211
Feb. 19, 2019 (JP) ................................ 2019-027731

(51) Int. Cl.
*H01Q 1/50* (2006.01)
*H01F 38/14* (2006.01)
(Continued)

(52) U.S. Cl.
CPC ............... *H01F 38/14* (2013.01); *H01Q 1/50* (2013.01); *H01Q 5/307* (2015.01); *H01Q 21/30* (2013.01)

(58) Field of Classification Search
CPC ............. H01F 38/14; H01F 2027/2809; H01F 27/2804; H01F 19/04; H01Q 1/50;
(Continued)

(56) References Cited

U.S. PATENT DOCUMENTS 10,320,086 B2 * 6/2019 Kerselaers ............. H01Q 9/285
11,128,046 B2 * 9/2021 Mikawa ................ H01Q 5/335
(Continued)

FOREIGN PATENT DOCUMENTS

JP 2012-109875 A 6/2012
JP 5505561 B2 5/2014
(Continued)

OTHER PUBLICATIONS

Official Communication issued in International Patent Application No. PCT/JP2019/016120, mailed on Jun. 18, 2019.

*Primary Examiner* — Hai V Tran
(74) *Attorney, Agent, or Firm* — Keating & Bennett, LLP

(57) ABSTRACT

An antenna coupling element includes a first coil connected to a first radiating element and a feeder circuit and a second coil connected to a second radiating element and electromagnetically coupled to the first coil. The first and second coils have a relationship in which a direction of a magnetic field generated in the first coil when a current flows from the first coil toward the first radiating element and a direction of a magnetic field generated in the second coil when a current flows from the second coil toward the second radiating element are opposite to each other. The first and second coils are set such that a resonant frequency of a fundamental wave of the second radiating element with a transformer defined by the first coil and the second coil is lower than a resonant frequency of a fundamental wave of the first radiating element.

19 Claims, 13 Drawing Sheets

(51) Int. Cl.
*H01Q 5/307* (2015.01)
*H01Q 21/30* (2006.01)

(58) Field of Classification Search
CPC .......... H01Q 5/307; H01Q 21/30; H01Q 5/40; H01Q 9/42
See application file for complete search history.

(56) References Cited

U.S. PATENT DOCUMENTS

| | | | | |
|---|---|---|---|---|
| 2005/0190107 | A1* | 9/2005 | Takagi | H01Q 21/30 343/702 |
| 2011/0074648 | A1* | 3/2011 | Shinkawa | H01Q 21/30 343/866 |
| 2011/0109512 | A1* | 5/2011 | Onaka | H01Q 5/392 343/700 MS |
| 2012/0127055 | A1* | 5/2012 | Yamagajo | H01Q 5/371 343/850 |
| 2012/0169553 | A1* | 7/2012 | Nomura | H01Q 1/38 343/741 |
| 2012/0218165 | A1* | 8/2012 | Kato | H01Q 5/335 343/852 |
| 2013/0249767 | A1* | 9/2013 | Ishizuka | H03H 7/38 333/124 |
| 2014/0049440 | A1* | 2/2014 | Ueki | H01Q 5/357 343/852 |
| 2014/0218246 | A1* | 8/2014 | Ishizuka | H01Q 5/335 343/749 |
| 2016/0064821 | A1* | 3/2016 | Nakano | H01F 38/14 343/788 |
| 2016/0248450 | A1* | 8/2016 | Ishizuka | H01F 27/29 |
| 2017/0077599 | A1* | 3/2017 | Sayama | H01Q 1/523 |
| 2017/0133999 | A1* | 5/2017 | Ishizuka | H03H 9/64 |
| 2018/0114042 | A1* | 4/2018 | Tenno | G06K 7/10336 |
| 2018/0277951 | A1* | 9/2018 | Nishikawa | H01Q 1/48 |
| 2019/0173175 | A1* | 6/2019 | Mikawa | H01Q 5/378 |

FOREIGN PATENT DOCUMENTS

| | | | |
|---|---|---|---|
| JP | 5505581 | B1 | 5/2014 |
| WO | 2012/153690 | A1 | 11/2012 |

* cited by examiner

ANTENNA COUPLING ELEMENT, ANTENNA DEVICE, AND COMMUNICATION TERMINAL DEVICE

CROSS REFERENCE TO RELATED APPLICATIONS

This application claims the benefit of priority to Japanese Patent Application No. 2019-027731 filed on Feb. 19, 2019 and Japanese Patent Application No. 2018-084211 filed on Apr. 25, 2018, and is a Continuation Application of PCT Application No. PCT/JP2019/016120 filed on Apr. 15, 2019. The entire contents of each application are hereby incorporated herein by reference.

BACKGROUND OF THE INVENTION

1. Field of the Invention

The present invention relates to an antenna coupling element connected between a plurality of radiating elements and a feeder circuit, and to an antenna device and a communication terminal device that include the antenna coupling element.

2. Description of the Related Art

An antenna device including two radiating elements coupled to each other directly or indirectly is used to broaden a usable frequency range of the antenna device or to support a plurality of frequency ranges. Japanese Patent No. 5505561 discloses an antenna device including two radiating elements and an antenna coupling element for feeding the two radiating elements.

It may be necessary for communication antennas used in, for example, cellular phones to cover a wide band, such as a range of 0.60 GHz to 2.7 GHz, with the aim of supporting carrier aggregation, which is a technology of increasing the transmission rate by simultaneously using a plurality of frequency ranges, or the like. Moreover, in order to support carrier aggregation, an antenna device capable of simultaneously using wide ranges is needed.

The antenna device illustrated in Japanese Patent No. 5505561 is one in which the antenna coupling element is connected between the two radiating elements (feed radiating element and non-feed radiating element) and a feeder circuit. This type of the antenna device is useful in covering wide ranges simultaneously.

To further broaden the usable frequency range of the antenna device in, for example, a low band (0.60 GHz to 0.96 GHz), however, the non-feed radiating element needs to have a longer length. To have the longer radiating element, because an area usable for forming the radiating elements is limited in a small communication terminal, such as a cellular phone terminal, the above radiating elements may have to be designed such that they extend in the same or substantially the same direction at least partially so as to extend along each other.

Unfortunately, for the antenna device including the feeder circuit and the two radiating elements connected to each other with the antenna coupling element disposed therebetween, when the two radiating elements include the sections extending in the same or substantially the same direction, an undesired phenomenon may occur in which magnetic fields generated from the two radiating elements weaken each other.

Here, a conceptual diagram of frequency characteristics of radiation efficiency of the antenna device with the above-described undesired phenomenon is illustrated in FIG. 20. In FIG. 20, characteristics E1 indicate the frequency characteristics of the radiation efficiency for the feed radiating element alone, and characteristics E2 indicate the frequency characteristics of the radiation efficiency of the antenna device in a state where the above-described antenna coupling element and the non-feed radiating element for the low band are included. When the antenna coupling element and the non-feed radiating element for the low band are included and thus the magnetic fields generated from the two radiating elements weaken each other, the radiation efficiency in the frequency range supported by the feed radiating element (around 0.96 GHz) decreases, as illustrated in the drawing.

As in such a case, when the antenna device includes the two radiating elements including the sections extending in the same or substantially the same direction, the presence of the non-feed radiating element may hinder radiation in the vicinity of the resonant frequency of the feed radiating element.

SUMMARY OF THE INVENTION

Preferred embodiments of the present invention provide antenna coupling elements that are each capable of reducing or preventing a decrease in radiation efficiency caused by a phenomenon in which magnetic fields generated from at least two radiating elements weaken each other and provide antenna devices and communication terminal devices that each include such an antenna coupling element.

An antenna coupling element according to a preferred embodiment of the present disclosure includes a first coil connected to a first radiating element and a feeder circuit or connected to the first radiating element and a ground, and a second coil connected to a second radiating element and electromagnetically coupled to the first coil.

The first coil and the second coil are wound such that a direction of a magnetic field generated in the first coil when a current flows from the first coil to the first radiating element and a direction of a magnetic field generated in the second coil when a current flows from the second coil to the second radiating element are opposite to each other. A resonant frequency of a fundamental wave of the second radiating element including a transformer defined by the first coil and the second coil is lower than a resonant frequency of a fundamental wave of the first radiating element including the first coil.

According to the above-described configuration, in the resonant frequency range of the first radiating element, when the current flows from the first coil to the first radiating element, the current flows from the second coil toward the second radiating element. Therefore, even when the first radiating element and the second radiating element including sections extending in the same or substantially the same direction, the magnetic fields generated from the first radiating element and the second radiating element do not weaken each other, and the decrease in radiation efficiency is able to be reduced or prevented.

According to preferred embodiments of the present invention, antenna coupling elements that are each capable of reducing or preventing a decrease in radiation efficiency caused by a phenomenon in which magnetic fields generated from at least two radiating elements weaken each other, and antenna devices and communication terminal devices each including such an antenna coupling element, are able to be obtained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
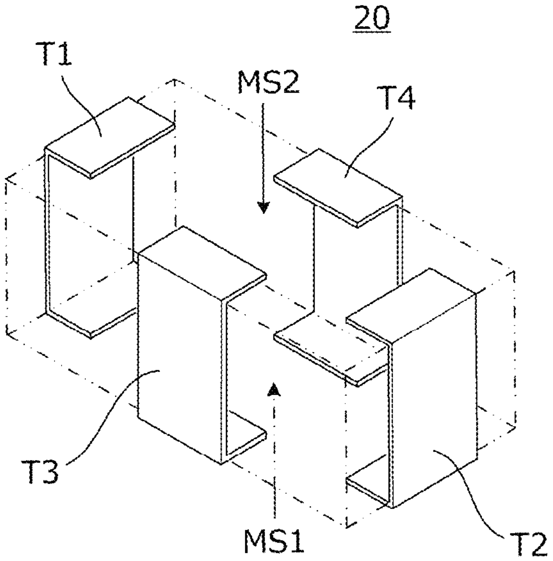
FIG. 1 is a perspective view of an antenna coupling element 20 according to a first preferred embodiment of the present invention.

Preferred embodiments of the present invention are described below by using several concrete examples with reference to the drawings. In the drawings, the same reference numerals are used to denote the same or similar elements and portions. Although the preferred embodiments are separately illustrated for the sake of convenience in consideration of description of main points or ease of understanding, the configurations illustrated in different preferred embodiments can be replaced or combined in part. In a second and subsequent preferred embodiments, description of elements and portions common to a first preferred embodiment is omitted, and only different points are described. In particular, similar operational advantages from similar elements and configurations are not individually described for each preferred embodiment.

First Preferred Embodiment

FIG. 1 is a perspective view of an antenna coupling element 20 according to the first preferred embodiment. The antenna coupling element 20 according to the present preferred embodiment is a chip component having a rectangular or substantially rectangular parallelepiped shape mountable on a circuit substrate inside electronic equipment. In FIG. 1, the external shape of the antenna coupling element 20 is indicated by a dash-dot-dot line. A first radiating element connection terminal T1, a feeder circuit connection terminal T2, a ground connection terminal T3, and a second radiating element connection terminal T4 are disposed on the outer surface of the antenna coupling element 20. The antenna coupling element 20 includes a first surface MS1 and a second surface MS2 opposite to that first surface. In the present preferred embodiment, the first surface MS1 is a mountable surface.

Figure 2A:
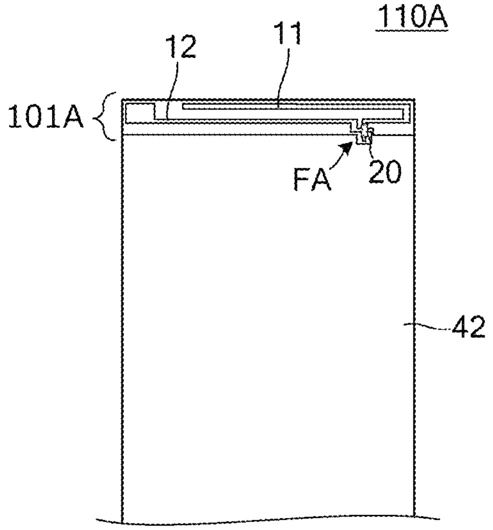
FIG. 2A is a plan view that illustrates a main configuration of an antenna device 101A and a communication terminal device 110A including the antenna device 101A.
Figure 2B:
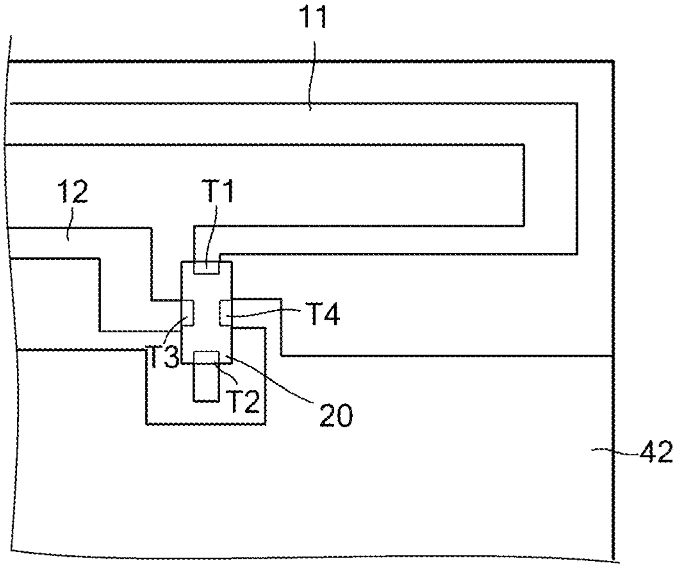
FIG. 2B is an enlarged plan view of the antenna device 101A, in particular, a feeding section FA (mountable section in the antenna coupling element).

FIG. 2A is a plan view that illustrates a main configuration of an antenna device 101A and a communication terminal device 110A including the antenna device 101A. FIG. 2B is an enlarged plan view of the antenna device 101A, in particular, a feeding section FA (mountable section in the antenna coupling element).

FIG. 2A illustrates, in particular, a circuit substrate in the communication terminal device 110A. The circuit substrate includes a ground region where a ground conductive pattern 42 is disposed and a non-ground region where the ground conductive pattern 42 is not disposed. A first radiating element 11 and a second radiating element 12 are disposed in the non-ground region. The non-ground region may be disposed in another substrate provided on that circuit substrate.

The first radiating element connection terminal T1 on the antenna coupling element 20 is connected to the first radiating element 11. The second radiating element connection terminal T4 is connected to the second radiating element 12. The feeder circuit connection terminal T2 is connected to a transmission line connected to the feeder circuit. The ground connection terminal T3 is connected to the ground conductive pattern 42.

The first radiating element 11 is defined by a linear conductive pattern extending rightward from the feeding section FA and folded leftward at the right end portion, as indicated as the directions illustrated in FIG. 2A. The main section of the second radiating element 12 is defined by a linear conductive pattern extending leftward from the feeding section FA along the border between the ground region and the non-ground region. The first radiating element 11 is more remote from the ground conductive pattern 42 than the second radiating element 12. This arrangement structure reduces the hindering of or interfering with radiation from the first radiating element 11 by the ground conductive pattern 42. Each of the first radiating element 11 and the second radiating element 12 defines and functions as a monopole antenna.

Because the first radiating element 11 is folded back, as described above, the first radiating element 11 and the second radiating element 12 are disposed in the non-ground region which has a limited area. Although the first radiating element 11 and the second radiating element 12 partially extend in the same or substantially the same direction, a phenomenon in which magnetic fields generated from the first radiating element 11 and the second radiating element 12 weaken each other is reduced or prevented, as described below.

Figure 3:
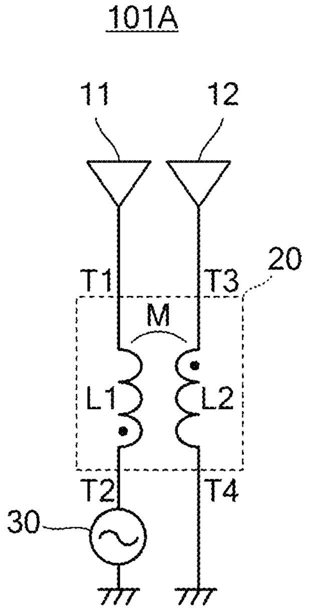
FIG. 3 is a circuit diagram of the antenna device 101A including the antenna coupling element 20.

FIG. 3 is a circuit diagram of the antenna device 101A including the above-described antenna coupling element 20. The antenna coupling element 20 includes a first coil L1 and a second coil L2 magnetically coupled to each other. In FIG. 3, M indicates that magnetic coupling. The direction of a magnetic field generated in the first coil L1 by a current flowing from the first coil L1 toward the first radiating element 11 and the direction of a magnetic field generated in the second coil L2 by a current flowing from the second coil L2 toward the second radiating element 12 are opposite to each other. In FIG. 3, dot marks indicate that relationship. The above-described ground corresponds to "reference potential".

As described below, a self-inductance of the second coil L2 is larger than that of the first coil L1. In a low band, in order to reduce or prevent a decrease in induced electromotive force occurring with a decrease in frequency, it is necessary to increase at least one of the coefficient of coupling between the first coil L1 and the second coil L2, the self-inductance of the first coil L1, and the self-inductance of the second coil L2. Increasing the coefficient of coupling is difficult in terms of a manufacturing process. The increased self-inductance of the first coil L1 leads to poor impedance matching with the first radiating element. Accordingly, as described above, increasing the self-inductance of the second coil L2 is preferable.

A feeder circuit 30 illustrated in FIG. 3 is configured to receive and output communication signals in a communication frequency range including the low band and a high band.

Figure 4:
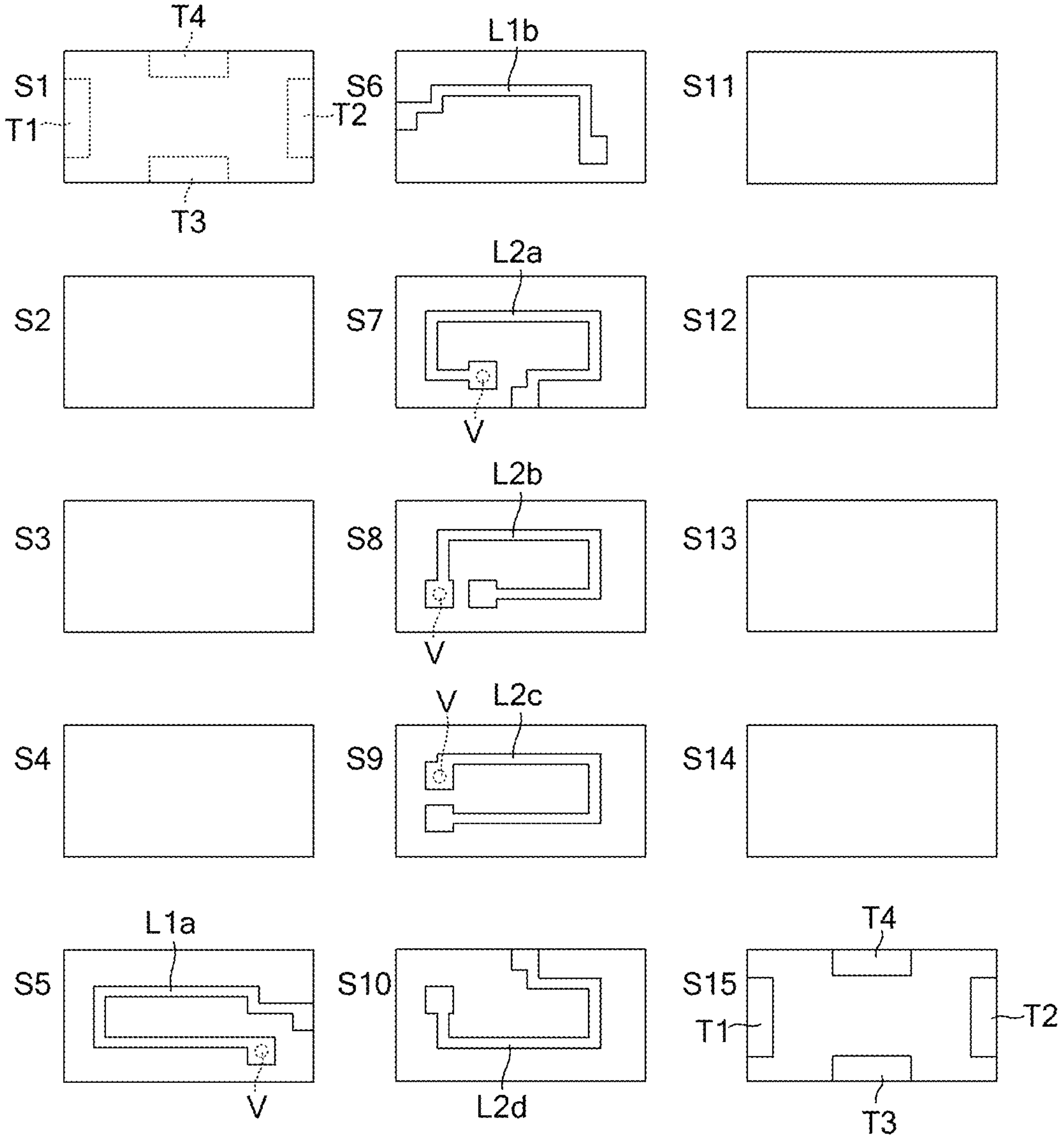
FIG. 4 is an exploded plan view of conductive patterns disposed on layers of the antenna coupling element 20.
Figure 5:
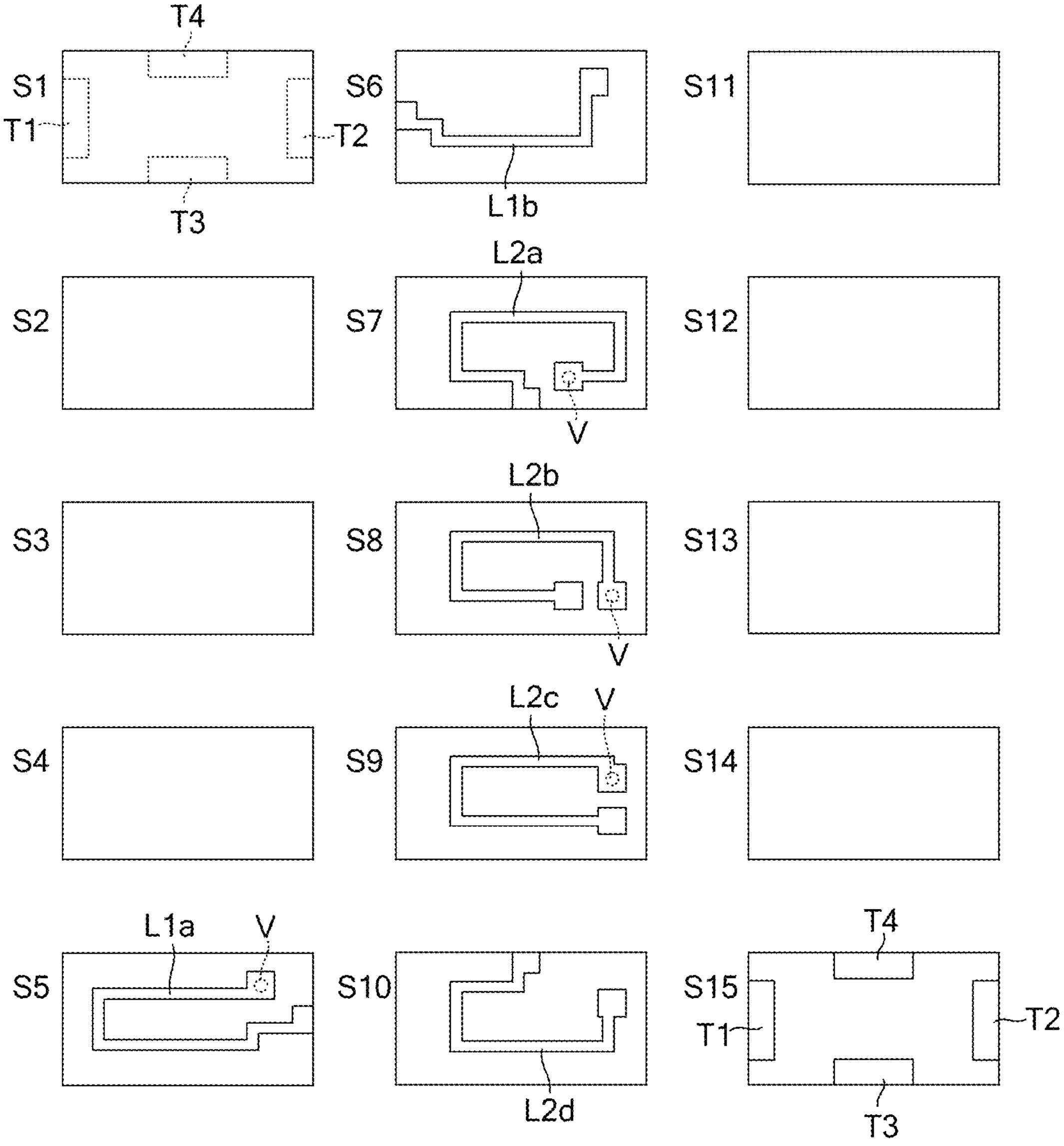
FIG. 5 is an exploded plan view of conductive patterns disposed on the layers of the antenna coupling element 20 in an example different from the example illustrated in FIG. 4.

FIGS. 4 and 5 are exploded plan views that illustrate conductive patterns disposed on layers of the antenna coupling element 20. The conductive patterns disposed on the layers of the antenna coupling element 20 in FIGS. 4 and 5 are different in part.

In FIGS. 4 and 5, the terminals T1, T2, T3, and T4 are disposed on the lower surface of a lowermost insulating base S1 and the upper surface of an insulating base S15. After lamination, the terminals T1, T2, T3, and T4 are also disposed on side surfaces of insulating bases S2 to S14. Conductive patterns L1*a* and L1*b* are disposed on the upper surfaces of the insulating bases S5 and S6, respectively. Conductive patterns L2*a* to L2*d* are disposed on the upper surfaces of the insulating bases S7 to S10, respectively. The terminals T1, T2, T3, and T4 are disposed on the upper surface of the uppermost insulating base S15.

A first end of the conductive pattern L1*a* is connected to the terminal T2 with an interlayer connection conductor disposed therebetween on a side surface of a multilayer body. A second end of the conductive pattern L1*a* is connected to a first end of the conductive pattern L1*b* with an interlayer connection conductor V disposed therebetween. A second end of the conductive pattern L1*b* is connected to the terminal T1 with an interlayer connection conductor disposed therebetween on a side surface of the multilayer body.

A first end of the conductive pattern L2*a* is connected to the terminal T3 with an interlayer connection conductor disposed therebetween on a side surface of the multilayer body. A second end of the conductive pattern L2*a* is connected to a first end of the conductive pattern L2*b* with an interlayer connection conductor V disposed therebetween. A second end of the conductive pattern L2*b* is connected to a first end of the conductive pattern L2*c* with an interlayer connection conductor V disposed therebetween. A second end of the conductive pattern L2*c* is connected to a first end of the conductive pattern L2*d* with an interlayer connection conductor V disposed therebetween. A second end of the conductive pattern L2*d* is connected to the terminal T4 with an interlayer connection conductor disposed therebetween on a side surface of the multilayer body.

The above-described conductive patterns L1*a* and L1*b* and the interlayer connection conductor connecting them define the first coil L1. The conductive patterns L2*a* to L2*d* and the interlayer connection conductors connecting them define the second coil L2. The coil opening of the first coil L1 and that of the second coil L2 overlap each other when the multilayer body is seen in plan view. The number of turns of the second coil L2 is larger than that of the first coil L1. The self-inductance of the second coil L2 is larger than that of the first coil L1.

The structure for having the self-inductance of the second coil L2 larger than that of the first coil L1 is not limited to the structure in which the number of layers of the conductive patterns for the second coil L2 is larger illustrated in FIG. 4. Examples of the method for achieving this structure may include, for example, increasing the number of turns of the conductive pattern on each of the layers without including different numbers of layers, narrowing the line width of the conductive pattern, and increasing the length of the conductive pattern.

In FIGS. 4 and 5, the conductive patterns L1*a* and L1*b* are inverted in the up-and-down direction, and the conductive patterns L2*a*, L2*b*, L2*c*, and L2*d* are inverted in the right-and-left direction. In both examples shown in FIGS. 4 and 5, the first coil L1 and the second coil L2 are wound such that the direction of a magnetic field generated in the first coil L1 by a current flowing from the first coil L1 toward the first radiating element 11 and the direction of a magnetic field generated in the second coil L2 by a current flowing from the second coil L2 toward the second radiating element 12 are opposite to each other, as illustrated in FIG. 3.

When the antenna coupling element 20 is made of a resin multilayer substrate, one example of each of the insulating bases S1 to S15 may be a liquid crystal polymer (LCP) sheet, and one example of each of the conductive patterns L1*a*, L1*b*, and L2*a* to L2*d* may be provided by patterning of copper foil. When the antenna coupling element 20 is made of a ceramic multilayer substrate, one example of each of the insulating bases S1 to S15 may be low temperature co-fired ceramics (LTCC), and one example of each of the conductive patterns L1*a*, L1*b*, and L2*a* to L2*d* may be provided by printing of copper paste. The antenna coupling element 20 is not limited to the ceramic multilayer substrate, and, for example, it may be formed by repeating application of insulating paste predominantly including glass by screen-printing. In that case, the above-described various conductive patterns are formed by a photolithography process, for example.

As described above, because the base layers are non-magnetic materials (are not magnetic ferrite), the antenna coupling element 20 can be used as a transformer with a predetermined inductance and a predetermined coefficient of coupling in a high-frequency range of about 0.60 GHz to about 2.7 GHz, for example.

The conductive patterns L1*a*, L1*b*, and L2*a* to L2*d* congregate on intermediate layers of the multilayer body. Thus, in the state where that antenna coupling element 20 is mounted on the circuit substrate, the distance between the ground conductor on the circuit substrate and each of the first coil L1 and the second coil L2 is sufficient. Even if a metallic member is near the upper portion of the antenna coupling element 20, the distance between the metallic member and each of the first coil L1 and the second coil L2 is sufficient. Therefore, effects or interference of the surroundings on magnetic fields generated from the first coil L1 and the second coil L2 are reduced, and stable characteristics are obtained.

Figure 6A:
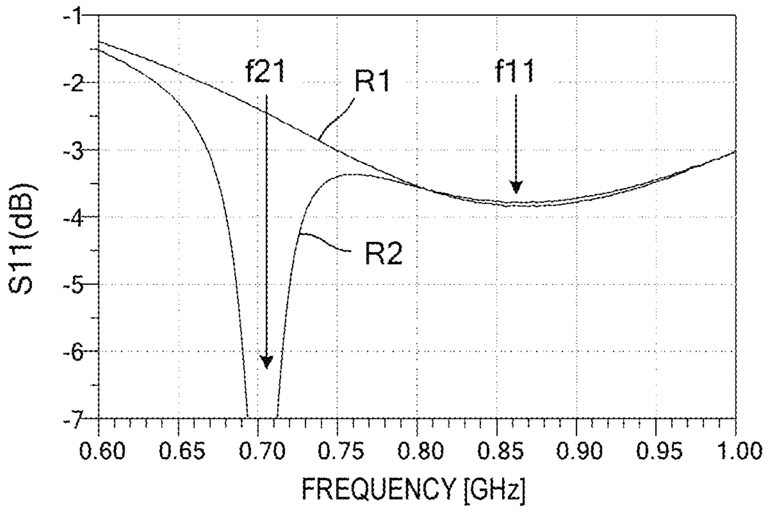
FIG. 6A illustrates frequency characteristics of reflection coefficients of the antenna device 101A.
Figure 6B:
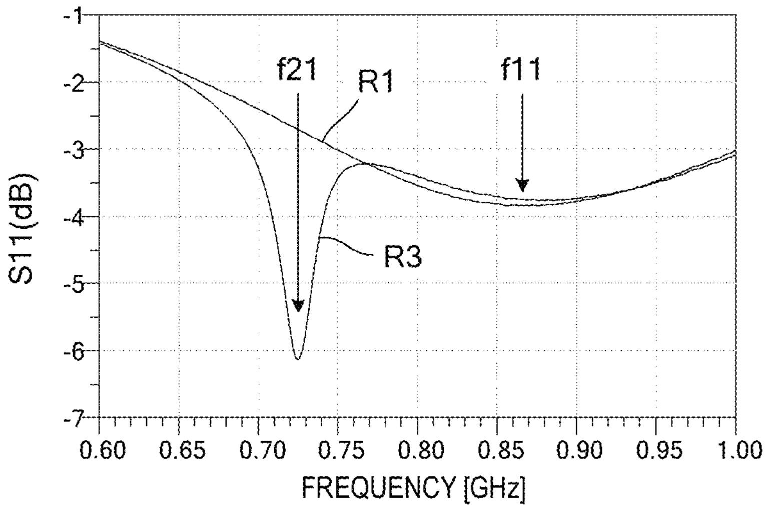
FIG. 6B illustrates frequency characteristics of reflection coefficients of an antenna device in a comparative example.
Figure 7A:
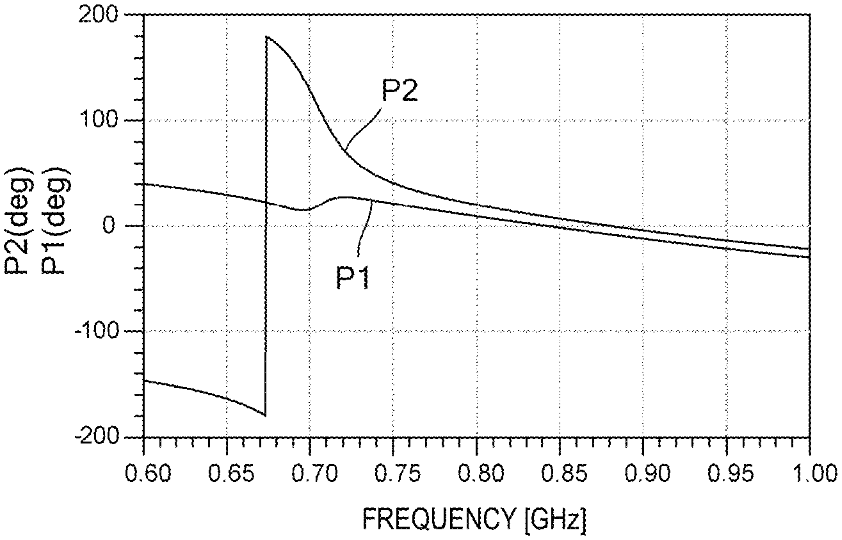
FIG. 7A illustrates frequency characteristics of current phases of the antenna device 101A.
Figure 7B:
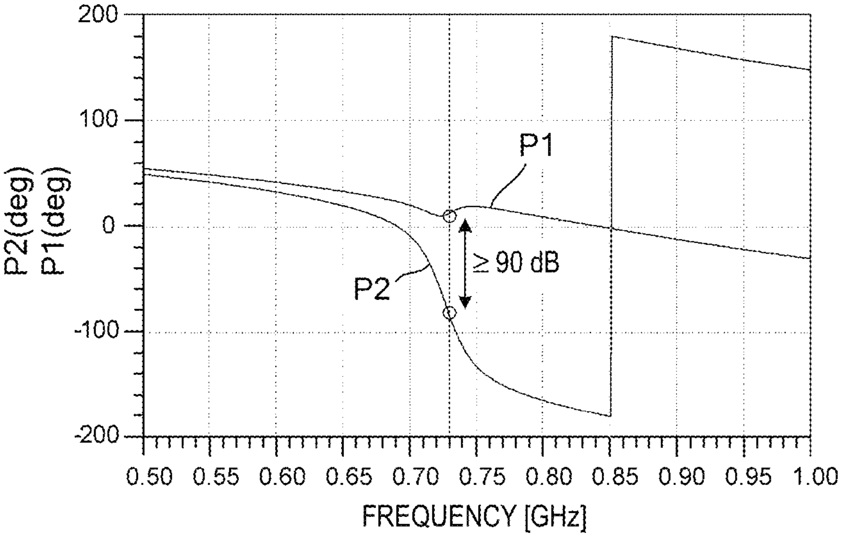
FIG. 7B illustrates frequency characteristics of current phases of the antenna device in the comparative example.

FIG. 6A illustrates frequency characteristics of reflection coefficients of the antenna device 101A. FIG. 6B illustrates frequency characteristics of reflection coefficients of an antenna device in a comparative example. FIG. 7A illustrates frequency characteristics of current phases of the antenna device 101A. FIG. 7B illustrates frequency characteristics of current phases of the antenna device in the comparative example. The antenna device in the comparative example includes an antenna coupling element whose polarity of coupling between the first coil L1 and the second coil L2 in the antenna coupling element 20 is opposite to that in the example illustrated in FIG. 3.

In FIGS. 6A and 6B, the horizontal axis indicates the frequency, and the vertical axis indicates the reflection coefficient. Here, a reflection coefficient R2 is the reflection coefficient as viewed from the feeder circuit 30 toward the antenna coupling element 20 in FIG. 3 (that is, of the antenna device 101A). A reflection coefficient R1 is the reflection coefficient as viewed from the feeder circuit connection terminal T2 toward the first radiating element 11 in FIG. 3 (that is, of the first radiating element 11 with the first coil L1). A reflection coefficient R3 is the reflection coefficient as viewed from the feeder circuit toward the antenna coupling element in the antenna device in the comparative example (that is, of the antenna device in the comparative example).

In FIGS. 6A and 6B, a frequency f11 is the resonant frequency of the first radiating element 11 with the first coil L1 (resonant frequency based on the first coil L1 and the first radiating element 11), and a frequency f21 is the resonant frequency of a fundamental wave based on the antenna coupling element 20 and the second radiating element 12. In that way, the first radiating element 11 with the first coil L1 resonates with the fundamental wave at the frequency f11, and the antenna device as a whole resonates with the fundamental wave at the frequency f21.

The antenna device 101A in the present preferred embodiment and the antenna device in the comparative example differ in the interaction between the first radiating element 11 and the second radiating element 12. In the present preferred embodiment, mainly the magnetic coupling between the first radiating element 11 and the second radiating element 12 is strengthened. Therefore, apparent inductance components of the radiating elements are larger and the resonant frequencies are lower, in comparison with the comparative example, in which the magnetic fields weaken each other. The same applies for the reason why the reflection coefficients at the frequency f21 are different in FIGS. 6A and 6B.

In FIGS. 7A and 7B, the horizontal axis indicates the frequency, and the vertical axis indicates the current phase. Here, a phase P1 is the phase of a current flowing through the first radiating element 11 in FIG. 3. A phase P2 is the phase of a current flowing through the second radiating element 12 in FIG. 3.

As illustrated in FIG. 7B, in the antenna device according to the comparative example, the impedance of the second radiating element 12 changes to an inductive impedance at the resonant frequency of the first radiating element 11 (for example, about 0.85 GHz), and at higher frequencies the phase difference between the current flowing through the first radiating element 11 and the current flowing through the second radiating element 12 is larger. In the example illustrated in FIG. 7B, the phase difference is larger than about 90 degrees at or above a frequency of about 0.73 GHz. Thus, at or above the frequency about 0.73 GHZ, the magnetic field generated from the first radiating element 11 is weakened by the magnetic field from the second radiating element 12, and radiation from the first radiating element 11 is hindered or interfered with. The phase difference is about 180 degrees around the resonant frequency of the first radiating element 11 (for example, about 0.85 GHz), and the magnetic field from the first radiating element 11 weakens the magnetic field from the second radiating element 12.

"The phase of the current flowing through the first radiating element 11" described above is obtainable by measuring the phase of the current flowing between the first coil L1 in the antenna coupling element 20 and the first radiating element 11 with a network analyzer or the like. Actually measuring it, however, is a difficult task because current probes need to be in positions that are not close to each other. One example method for obtaining "the phase of the current flowing through the first radiating element 11" may be first measuring the scattering (S) parameter of the first radiating element 11 alone and the S parameter of the antenna coupling element 20 alone, and then calculating the current flowing between the first coil L1 in the antenna coupling element 20 and the first radiating element 11 in a circuit simulation using the circuit configuration of the antenna device 101A, the S parameter of the first radiating element 11, and the S parameter of the antenna coupling element 20. The same applies to "the phase of the current flowing through the second radiating element 12." That is, "the phase of the current flowing through the second radiating element 12" is obtained by first measuring the S parameter of the second radiating element 12 alone and the S parameter of the antenna coupling element 20 alone, and then calculating the current flowing between the second coil L2 in the antenna coupling element 20 and the second radiating element 12 in a circuit simulation by using the circuit configuration of the antenna device 101A, the S parameter of the second radiating element 12, and the S parameter of the antenna coupling element 20. If measurement using the current probes in positions not close to each other is possible, "the phase of the current flowing through the first radiating element 11" and "the phase of the current flowing through the second radiating element 12" may also be obtainable by directly measuring the phase of the current flowing between the first coil L1 in the antenna coupling element 20 and the first radiating element 11 and the phase of the current flowing between the second coil L2 in the antenna coupling element 20 and the second radiating element 12.

In contrast, in the antenna device 101A according to the present preferred embodiment, as illustrated in FIGS. 6A and 7A, the phase difference between the current flowing through the first radiating element 11 and that through the second radiating element 12 does not exceed about 90 degrees in a frequency range not less than about 0.70 GHz. Accordingly, the magnetic field generated from the first radiating element 11 in the low band is not likely to be weakened by the magnetic field from the second radiating element 12, and radiation from the first radiating element 11 is not hindered or interfered with.

Figure 8:
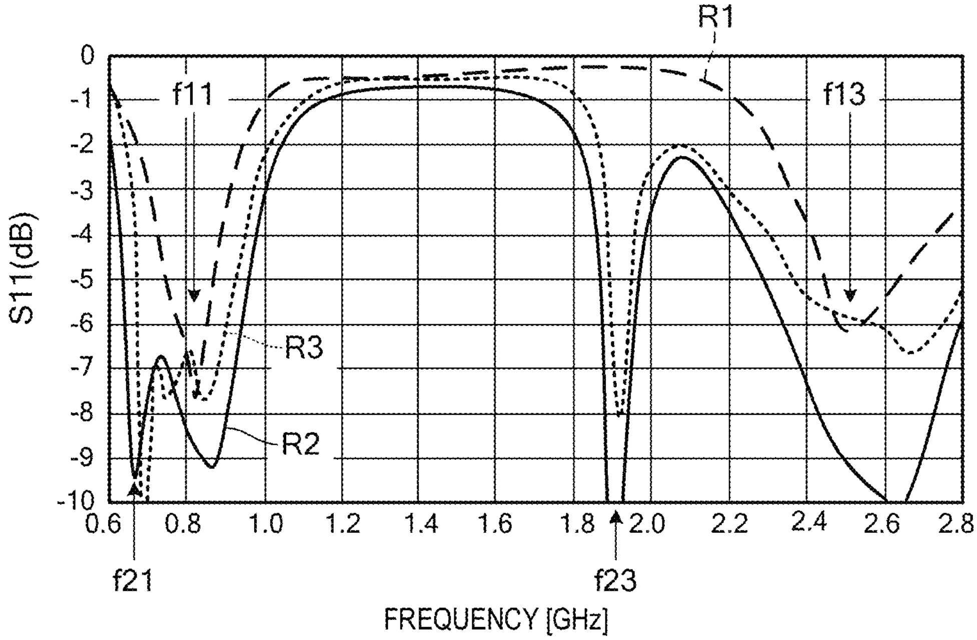
FIG. 8 illustrates frequency characteristics of reflection coefficients of the antenna devices in a frequency zone including a high band.

FIG. 8 illustrates frequency characteristics of reflection coefficients of the antenna devices in a frequency zone including the high band. In FIG. 8, as in FIGS. 6A and 6B, the reflection coefficient R2 is the reflection coefficient as viewed from the feeder circuit 30 toward the antenna coupling element 20 in FIG. 3, the reflection coefficient R1 is the reflection coefficient of the first radiating element 11 with the first coil L1, and the reflection coefficient R3 is the reflection coefficient as viewed from the feeder circuit toward the antenna coupling element in the antenna device in the comparative example.

In FIG. 8, frequencies of about 0.60 GHz to about 0.96 GHz correspond to the low band, and frequencies of about 1.71 GHz to about 2.69 GHz correspond to the high band.

Figure 9:
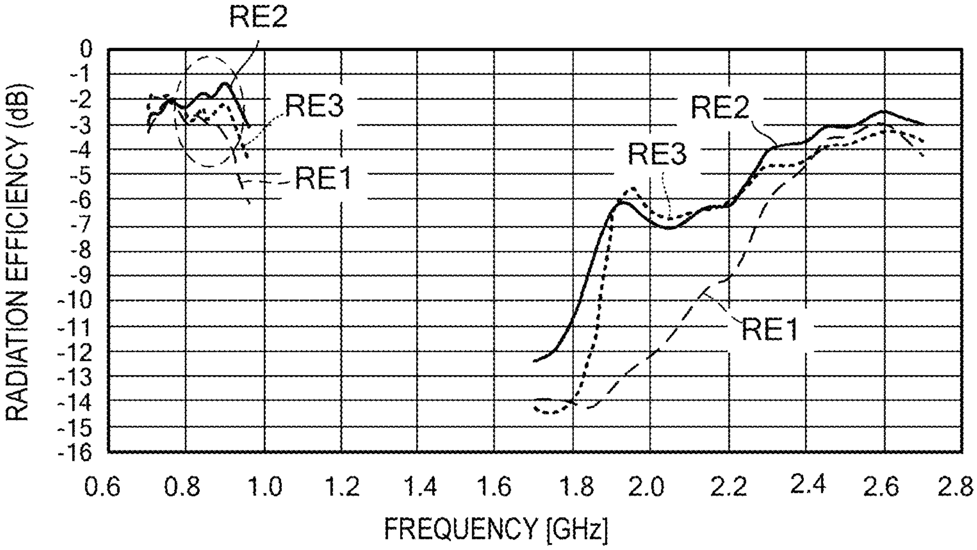
FIG. 9 illustrates frequency characteristics of radiation efficiencies of the antenna devices.

FIG. 9 illustrates frequency characteristics of radiation efficiencies of the antenna devices. In FIG. 9, a radiation efficiency RE1 is the radiation efficiency of the first radiating element 11, and radiation efficiencies RE2 and RE3 are the radiation efficiencies of the antenna devices including the transformer and the second radiating element 12. Here, RE2 is the radiation efficiency of the antenna device in the present preferred embodiment, and RE3 is the radiation efficiency of the antenna device in the comparative example.

As indicated in FIG. 8, the first radiating element 11 with the first coil L1 resonates with the fundamental wave at the frequency f11 within the above-described low band and resonates with the third harmonic at a frequency f13 within the high band. The resonance circuit including the transformer and the second radiating element 12 (second radiating element 12 with the transformer) resonates with the fundamental wave at the frequency f21 and resonates with the third harmonic at a frequency f23. The resonant frequency f21 of the fundamental wave of the second radiating element 12 with the transformer is set at a value lower than the resonant frequency f11 of the fundamental wave of the first radiating element 11 with the first coil L1. Thus, the usable frequency range of the antenna device in the low band is increased.

The resonant frequency f21 of the fundamental wave of the second radiating element 12 with the transformer can be set at a value higher than the resonant frequency f11 of the fundamental wave of the first radiating element 11 with the first coil L1. In that case, however, because the frequency f21 is near an anti-resonance point described below, the resistance component in the resonance system is large, and the power loss is large. Accordingly, as illustrated in the example illustrated in FIG. 8, the resonant frequency f21 of the fundamental wave of the second radiating element 12 with the transformer may preferably be set at a value lower than the resonant frequency f11 of the fundamental wave of the first radiating element 11 with the first coil L1.

As indicated in FIG. 8, there is not much difference between the reflection loss observed for the reflection coefficient R2 as viewed from the feeder circuit toward the antenna coupling element in the antenna device in the present preferred embodiment and that for the reflection coefficient R3 as viewed from the feeder circuit toward the antenna coupling element in the antenna device in the comparative example (the reflection loss in the present preferred embodiment is about 0.6 dB and that in the comparative example is about 0.8 dB, for example). In the present preferred embodiment, however, because the interference of the current is reduced such that the current phase difference does not exceed about 90 degrees, as indicated in the area surrounded by the broken line in FIG. 9, the radiation efficiency of the antenna device in the present preferred embodiment is improved by about 1 dB around the resonant frequency (about 0.8 GHz) of the first radiating element with the first coil L1, in comparison with the antenna device in the comparative example.

In the present preferred embodiment, the resonant frequency f23 of the third harmonic of the second radiating element 12 with the transformer is set at a value between the resonant frequency f11 of the fundamental wave of the first radiating element with the first coil L1 and the resonant frequency f13 of the third harmonic of the first radiating element 11 with the first coil L1. Thus, as indicated in FIG. 9, the radiation efficiency in the frequency range between the resonant frequency f21 of the fundamental wave of the second radiating element 12 with the transformer and the resonant frequency f23 of the third harmonic thereof can be improved.

An anti-resonance point of the first radiating element 11 with the first coil L1 occurs between the resonant frequency of the fundamental wave of the first radiating element 11 with the first coil L1 and the resonant frequency of the third harmonic thereof. The resonant frequency f23 of the third harmonic of the second radiating element 12 with the transformer may preferably be set at a value between the anti-resonant frequency and the resonant frequency f13 of the third harmonic of the first radiating element 11 with the first coil L1. This is because the resonance of the third harmonic of the second radiating element 12 with the transformer efficiently occurs and because the reflection coefficient around the resonant frequency f13 of the third harmonic of the first radiating element 11 with the first coil L1 decreases, and the frequency range in the high band can be increased.

Figure 10:
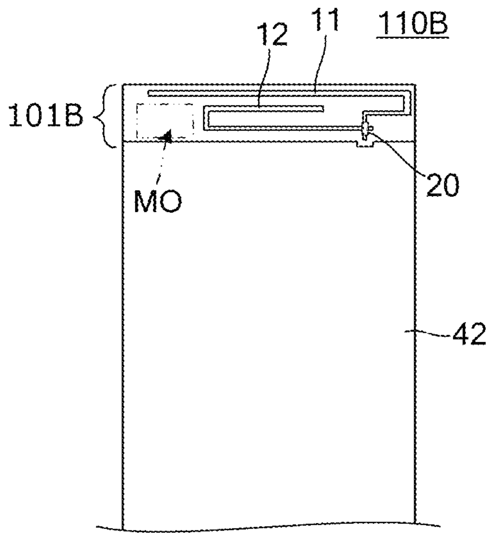
FIG. 10 is a plan view that illustrates a main configuration of an antenna device 101B and a communication terminal device 110B including it.

FIG. 10 is a plan view that illustrates a main configuration of an antenna device 101B whose configuration is partially different from that of the antenna device 101A illustrated in FIGS. 2A) and 2B and a communication terminal device 110B including the antenna device 101B. In this example, a conductive member MO, such as a metal body, is disposed near the non-ground region where the first radiating element 11 and the second radiating element 12 are disposed in the antenna device 101B or is arranged in that position. The first radiating element 11 has the same or substantially the same shape as that illustrated FIG. 2A, whereas the second radiating element 12 has a different shape in that it is folded back so as to avoid the conductive member MO and its vicinity.

With such a structure, the effects of the conductive member MO on the second radiating element 12 can be reduced or prevented. The region where the magnetic fields of the first radiating element 11 and the second radiating element 12 are strong is in the vicinity of the antenna coupling element 20. Therefore, when the first radiating element 11 and the second radiating element 12 include sections extending in opposite directions, as in this example, the operational advantages similar to the above-described operational advantages are obtainable.

Second Preferred Embodiment

In a second preferred embodiment of the present invention, several examples of configurations different from the first radiating element and the second radiating element in the first preferred embodiment are illustrated.

Figure 11:
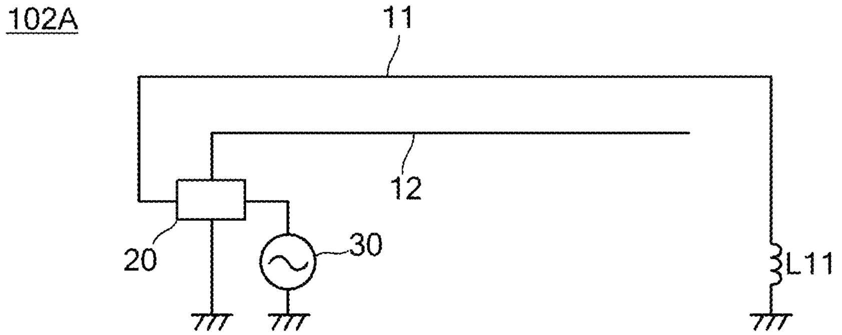
FIG. 11 illustrates a configuration of an antenna device 102A according to a second preferred embodiment of the present invention.

FIG. 11 illustrates a configuration of an antenna device according to the second preferred embodiment. That antenna device 102A includes the first radiating element 11, the second radiating element 12, the antenna coupling element 20, and an inductor L11. In the example illustrated FIGS. 2A and 2B, the first radiating element 11 defines and functions as a monopole antenna. In the example illustrated in FIG. 11, the first radiating element 11 defines and functions as a loop antenna. That is, the inductor L11 is interposed between the leading end of the first radiating element 11 and a ground, and the inductor L11 and the first radiating element 11 define a loop. The inductor L11 defines and functions as an element to adjust an effective electrical length of the first radiating element 11 or an element to adjust a resonant frequency of the loop antenna. The remaining configuration is the same as or similar to that illustrated in the first preferred embodiment.

Figure 12:
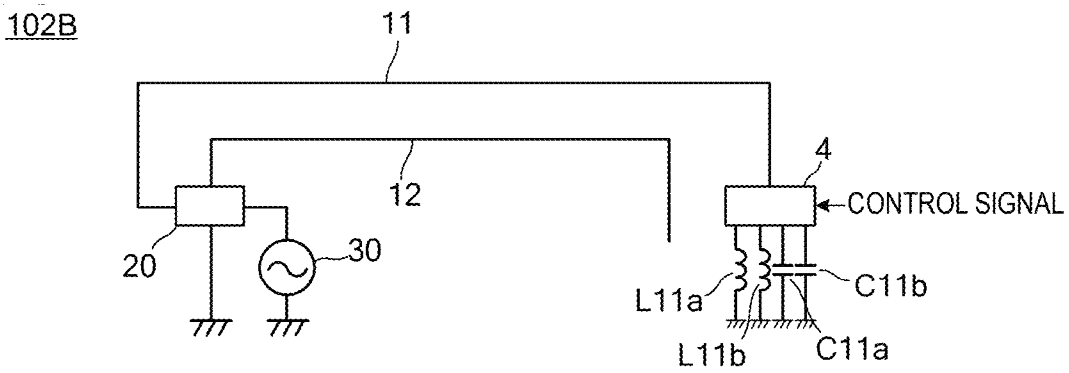
FIG. 12 illustrates a configuration of another antenna device 102B according to the second preferred embodiment of the present invention.

FIG. 12 illustrates a configuration of another antenna device according to the second preferred embodiment. That antenna device 102B includes the first radiating element 11, the second radiating element 12, the antenna coupling element 20, inductors Lila and L11*b*, capacitors C11*a* and C11*b*, and a switch 4. The switch 4 selectively connects one of the inductors Lila and L11*b* and the capacitors C11*a* and C11*b* to the leading end of the first radiating element 11 in response to a control signal supplied from the outside of the antenna device. Accordingly, the effective antenna length can be changed by the switch 4.

The inductors Lila and L11*b* have different inductances, and the capacitors C11*a* and C11*b* have different capacitances. The resonant frequency of the first radiating element 11 can be switched by selecting among the reactance elements Lila, L11*b*, C11*a*, and C11*b*. The remaining configuration is the same as or similar to that illustrated in FIG. 11.

As illustrated in FIGS. 11 and 12, when the loop antenna includes the first radiating element 11, the space for the first radiating element 11 can be reduced. With the loop antenna structure, fluctuations in antenna characteristics of the first radiating element 11 caused by the proximity of a human body can be reduced or prevented. Additionally, because the second radiating element 12 having the monopole structure is arranged structurally inside the loop antenna, fluctuations in antenna characteristics of the second radiating element 12 caused by the proximity of a human body can also be reduced or prevented.

Third Preferred Embodiment

Figure 13:
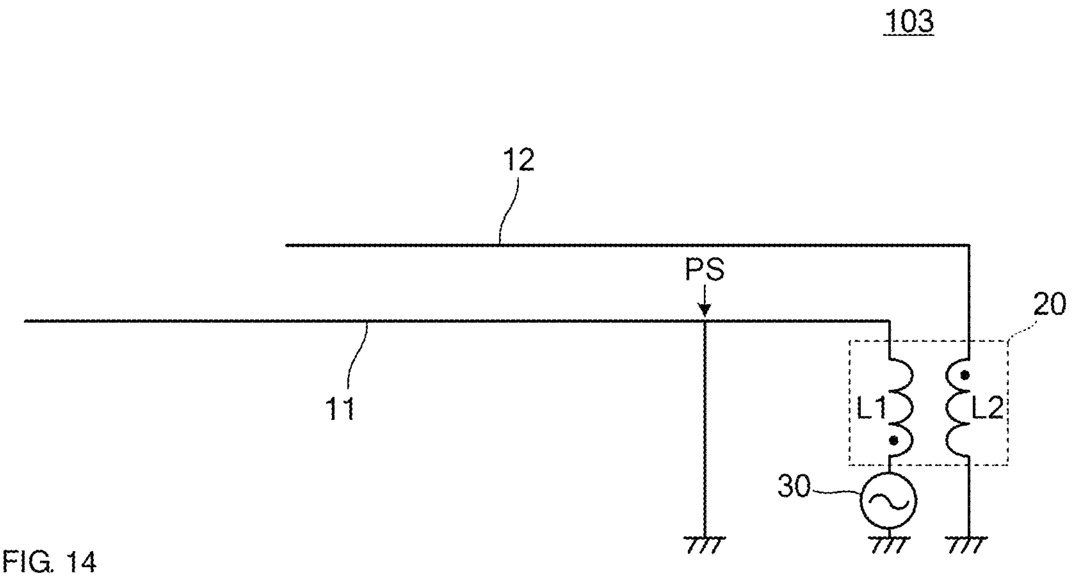
FIG. 13 illustrates a configuration of an antenna device 103 according to a third preferred embodiment of the present invention.

FIG. 13 illustrates a configuration of another antenna device according to a third preferred embodiment of the present invention. That antenna device 103 includes the first radiating element 11, the second radiating element 12, and the antenna coupling element 20. A feeding terminal of the first radiating element 11 is connected to the feeder circuit 30 with the first coil L1 in the antenna coupling element 20 disposed therebetween. The leading end of the first radiating element 11 is opened, and a predetermined ground position PS in the first radiating element 11 is grounded. In this configuration, the first radiating element 11 defines and functions as an inverted-F antenna. When the first radiating element 11 is a two-dimensionally extended conductor, it defines and functions as a planar inverted-F antenna (PIFA). In that way, when the first radiating element 11 is the inverted-F antenna or PIFA, the impedance of the first radiating element 11 can be on the same or similar level as the impedance of the feeder circuit, and the impedance matching is facilitated.

As described above, preferred embodiments of the present invention are also applicable to the antenna device in which the first radiating element 11 is the inverted-F antenna or PIFA.

Figure 14:
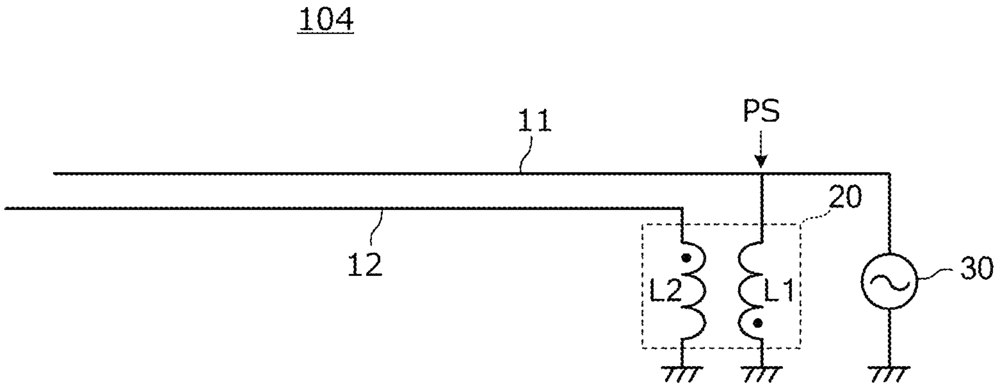
FIG. 14 illustrates a configuration of another antenna device 104 according to the third preferred embodiment of the present invention.

FIG. 14 illustrates a configuration of another antenna device according to the third preferred embodiment. That antenna device 104 includes the first radiating element 11, the second radiating element 12, and the antenna coupling element 20. The first coil L1 in the antenna coupling element 20 is connected as a short pin between the predetermined ground position PS in the first radiating element 11 and the ground. The second radiating element 12 is connected to the second coil L2 in the antenna coupling element 20. In this configuration, the first radiating element 11 defines and functions as an inverted-F antenna. When the first radiating element 11 is a two-dimensionally extended conductor, it defines and functions as a planar inverted-F antenna (PIFA). In the present preferred embodiment, because the first coil L1 is connected in the position where a current flowing through the first radiating element 11 is the largest, a decrease in electromotive force of the second radiating element 12 can be further reduced or prevented.

As described above, preferred embodiments of the present invention are also applicable to the antenna device in which the first radiating element 11 is the inverted-F antenna or PIFA.

Fourth Preferred Embodiment

Figure 15:
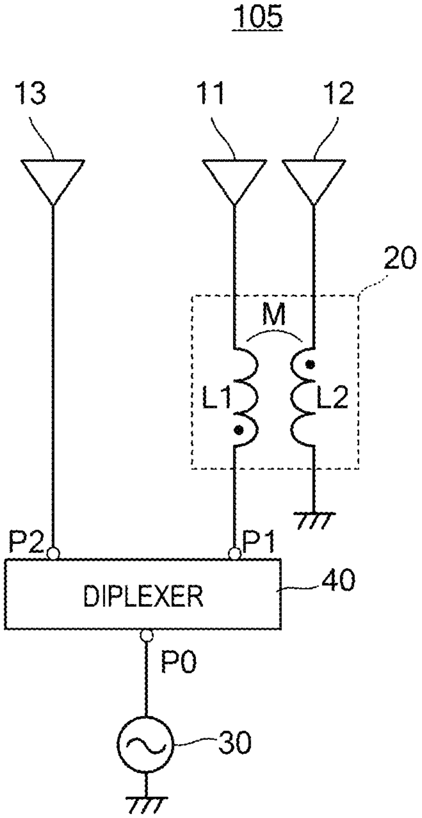
FIG. 15 illustrates a configuration of an antenna device 105 according to a fourth preferred embodiment of the present invention.

FIG. 15 illustrates a configuration of another antenna device 105 according to a fourth preferred embodiment of the present invention. The antenna device 105 includes the first radiating element 11, the second radiating element 12, a third radiating element 13, a diplexer 40, and the antenna coupling element 20. The antenna coupling element 20 is the same as or similar to that illustrated in the first preferred embodiment in, for example, FIGS. 4 and 5.

The antenna device 105 according to the present preferred embodiment assigns the low band in the usable frequencies of the antenna device 105 to the first radiating element 11 and assigns the high band to the second radiating element 12 and the third radiating element 13. In other words, the antenna device supports a broadened band by not assigning the range from the low band to the high band to a single radiating element but assigning the low band and the high band to different radiating elements, respectively.

The diplexer 40 includes a feeding port P0, an antenna port P1 for the high band, and an antenna port P2 for the low band. The feeding port P0 is connected to the feeder circuit 30, the antenna port P2 is connected to the third radiating element 13, and the antenna port P1 is connected to the first radiating element 11. The second radiating element 12 is coupled to the first radiating element 11 with the antenna coupling element 20 disposed therebetween, and the range on the high-band side is increased.

In the present preferred embodiment, because the use of the diplexer 40 enables the resonance of the fundamental wave of a single radiating element (that resonance in combination with the antenna coupling element 20) to be used for each of the low band and the high band, the antenna coupling element 20 can be used to increase the range on the high-band side. The present preferred embodiment is the same as or similar to the foregoing preferred embodiments in that the antenna coupling element 20, which is wound such that the direction of a magnetic field generated in the first coil L1 when a current flows from the first coil L1 toward the first radiating element 11 and the direction of a magnetic field generated in the second coil L2 when a current flows from the second coil L2 toward the second radiating element 12 are opposite to each other, is used to effectively increase the range for the resonance of the fundamental wave of the single radiating element. An antenna device that uses a mechanism of switching between the radiating elements by means of a switch, instead of the diplexer 40, can also increase the range in the high band similarly by using the antenna coupling element 20.

Figure 16:
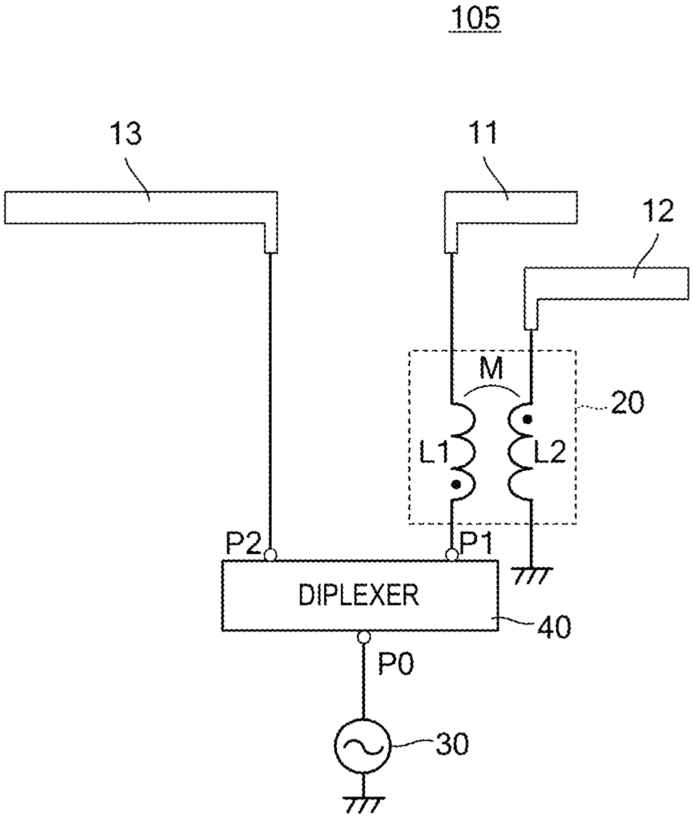
FIG. 16 illustrates a concrete configuration of conductive patterns in the antenna device 105 according to the fourth preferred embodiment of the present invention.

FIG. 16 illustrates a configuration of conductive patterns in the antenna device 105 according to the fourth preferred embodiment. Each of the first radiating element 11, the second radiating element 12, and the third radiating element 13 illustrated in FIG. 16 is a monopole antenna defined by a conductive pattern disposed on a substrate. Because the third radiating element 13 is assigned the low band, it is longer than the first radiating element 11 and the second radiating element 12. The second radiating element 12 is longer than the first radiating element 11. Because of this, radiation from the second radiating element 12 is unlikely to be hindered or interfered with by the first radiating element 11. The third radiating element 13 and each of the first radiating element 11 and the second radiating element 12 extend in mutually opposite directions. Thus, mutual interference between the third radiating element 13 and the first radiating element 11 and mutual interference between the third radiating element 13 and the second radiating element 12 can be reduced or prevented.

Figure 19:
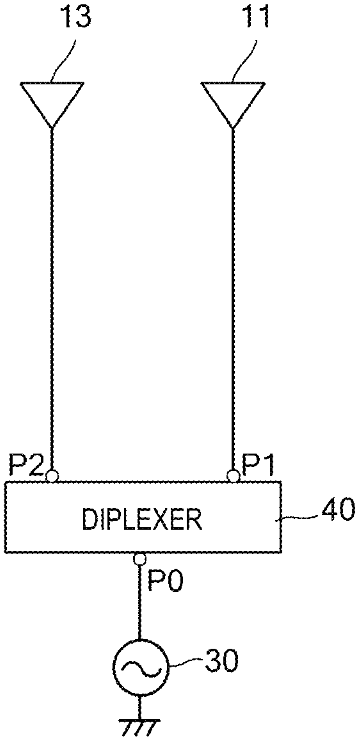
FIG. 19 illustrates a configuration of the antenna device as the comparative example to the antenna device according to the fourth preferred embodiment of the present invention.
Figure 20:
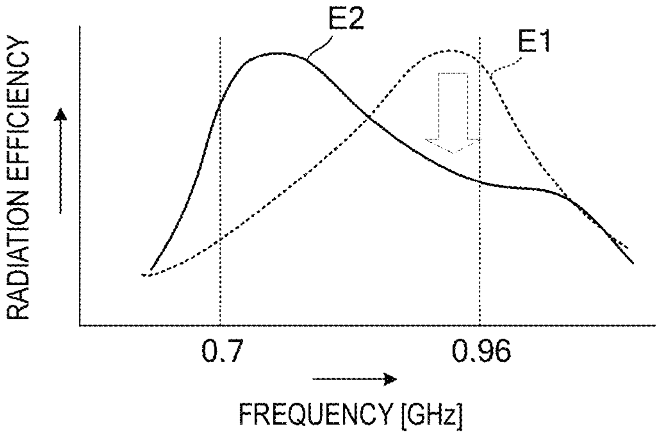
FIG. 20 PRIOR ART
FIG. 20 is a conceptual diagram that illustrates frequency characteristics of radiation efficiency of an antenna device when magnetic fields generated from two radiating elements weaken each other.

Here, an antenna device as a comparative example is illustrated in FIG. 19. The antenna device according to the comparative example differs from the antenna device according to the fourth preferred embodiment in that it does not include the second radiating element 12 or the antenna coupling element 20.

Figure 17:
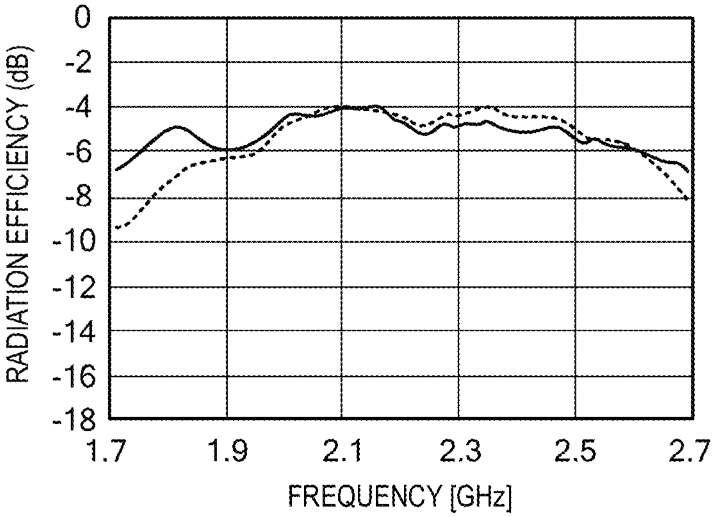
FIG. 17 illustrates radiation efficiencies in the high band of the antenna device 105 according to the fourth preferred embodiment of the present invention and an antenna device according to a comparative example.

FIG. 17 illustrates radiation efficiencies in the high band for the antenna device 105 according to the fourth preferred embodiment and the antenna device according to the comparative example. In FIG. 17, the horizontal axis indicates the frequency, the vertical axis indicates the radiation efficiency, the solid line indicates the characteristics of the antenna device 105 according to the fourth preferred embodiment, and the broken line indicates the characteristics of the antenna device according to the comparative example. FIG. 17 shows that the radiation efficiency of the antenna device according to the fourth preferred embodiment around about 1.70 GHz to about 1.80 GHz is about 2 dB to about 3 dB higher than that of the antenna device according to the comparative example. The difference between the radiation efficiency in the fourth preferred embodiment and that in the comparative example in the other frequency ranges is not more than about 1 dB, and they are considered to be approximately equal. This is because the resonance point of the second radiating element 12 is added to the resonance point of the first radiating element 11 by the presence of the antenna coupling element 20. Here, "the resonance of the first radiating element 11" and "the resonance of the second radiating element 12" are not the resonance of the first radiating element 11 alone and the resonance of the second radiating element 12 alone, respectively, but are the resonances in combination with the antenna coupling element 20. Therefore, it is shown that the range is also broadened by the presence of the second radiating element 12 and the antenna coupling element 20 in the configuration of the fourth preferred embodiment. As described above, in the antenna device in which the low band and the high band are assigned to the different radiating elements, respectively, resonance of the fundamental wave of the radiating element can also be used in the high band, and the range in the high band can be increased.

Figure 18:
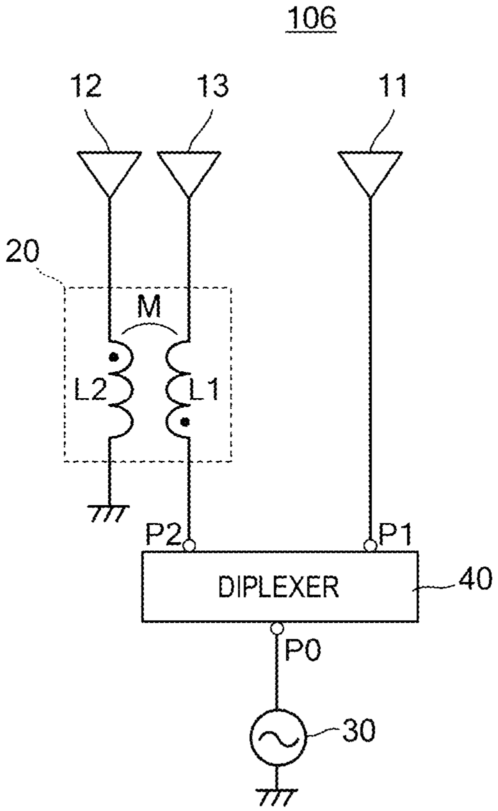
FIG. 18 illustrates a configuration of another antenna device 106 according to the fourth preferred embodiment of the present invention.

FIG. 18 illustrates a configuration of another antenna device 106 according to the fourth preferred embodiment. The antenna device 106 includes the first radiating element 11, the second radiating element 12, the third radiating element 13, the diplexer 40, and the antenna coupling element 20. The antenna coupling element 20 is the same as or similar to that illustrated in the first preferred embodiment.

The antenna device 106 assigns the high band in the usable frequencies of the antenna device 106 to the first radiating element 11 and assigns the low band to the second radiating element 12 and the third radiating element 13.

The diplexer 40 includes the feeding port P0, the antenna port P1 for the high band, and the antenna port P2 for the low band. The feeding port P0 is connected to the feeder circuit 30, the antenna port P2 is connected to the third radiating element 13, and the antenna port P1 is connected to the first radiating element 11. The second radiating element 12 is coupled to the first radiating element 11 with the antenna coupling element 20 disposed therebetween, and the range on the low-band side is increased.

FIG. 15 illustrates the example in which the antenna device assigning the low band and the high band to different radiating elements, respectively, uses the antenna coupling element 20 for the high-band side. The antenna device 106 illustrated in FIG. 18 can increase the range in the low band.

The above description of the preferred embodiments is illustrative and is not restrictive in any respect. A person of ordinary skill in the art can make modifications and changes as appropriate. The scope of the present invention is defined by the appended claims, rather than by the above-described preferred embodiments. The scope of the present invention includes changes from the preferred embodiments within the scope equivalent to the claims.

For example, one or both of the first radiating element 11 and the second radiating element 12 in preferred embodiments illustrated above may also be defined by a conductive member in electronic equipment. For example, a portion of a metal casing of the electronic equipment may define the first radiating element 11.

In preferred embodiments illustrated above, the examples in which the antenna coupling element including the first coil L1 and the second coil L2 is used and the antenna coupling element is disposed between the feeder circuit and the first and second radiating elements 11 and 12 are illustrated. In the case of an antenna device including three or more radiating elements, the antenna coupling element in the present preferred embodiment is also applicable to two of the three or more radiating elements.

A communication terminal device including the antenna coupling element, the antenna element, the feeder circuit, and the ground (conductor) as a reference potential in which preferred embodiments illustrated above are used may be provided.

The feeder circuit included in the communication terminal device described above may be configured to receive and output a communication signal in the low band including the resonant frequency of the fundamental wave of the first radiating element 11. It may also be configured to receive and output, in addition to the above-described signal in the low band, a communication signal in the high band including the resonant frequency of the third harmonic of the first radiating element 11 or the resonant frequency of the third harmonic of the second radiating element 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna coupling element comprising:

a first coil connected to at least one of a first radiating element and a feeder circuit; and a second coil connected to a second radiating element and electromagnetically coupled to the first coil; wherein the first coil and the second coil are wound such that a direction of a magnetic field generated in the first coil when a current flows from the first coil toward the first radiating element and a direction of a magnetic field generated in the second coil when a current flows from the second coil toward the second radiating element are opposite to each other;

the first coil and the second coil define a transformer;

a resonant frequency of a fundamental wave of the second radiating element with the transformer is lower than a resonant frequency of a fundamental wave of the first radiating element with the first coil; and each of the first coil and the second coil includes only one coil opening;

wherein a self-inductance of the second coil is larger than a self-inductance of the first coil.

2. The antenna coupling element according to claim 1, wherein a resonant frequency of a third harmonic of the second radiating element with the transformer is set at a value between the resonant frequency of the fundamental wave of the first radiating element and a resonant frequency of a third harmonic of the first radiating element.

3. An antenna device comprising:

the antenna coupling element according to claim 1;

the first radiating element; and the second radiating element.

4. The antenna device according to claim 3, wherein the resonant frequency of the fundamental wave of the first radiating element is within a frequency range not less than about 0.60 GHz and not greater than about 0.96 GHz.

5. The antenna device according to claim 3, wherein a self-inductance of the second coil is larger than a self-inductance of the first coil.

6. The antenna device according to claim 3, wherein a resonant frequency of a third harmonic of the second radiating element with the transformer is set at a value between the resonant frequency of the fundamental wave of the first radiating element and a resonant frequency of a third harmonic of the first radiating element.

7. A communication terminal device comprising:

the antenna coupling element according to claim 1;

the first radiating element;

the second radiating element; and the feeder circuit.

8. The communication terminal device according to claim 7, wherein a self-inductance of the second coil is larger than a self-inductance of the first coil.

9. The communication terminal device according to claim 7, wherein a resonant frequency of a third harmonic of the second radiating element with the transformer is set at a value between the resonant frequency of the fundamental wave of the first radiating element and a resonant frequency of a third harmonic of the first radiating element.

10. A communication terminal device comprising:

the antenna coupling element according to claim 1;

the first radiating element;

the second radiating element; and the feeder circuit; wherein the feeder circuit is configured to receive and output a communication signal in a low band including the resonant frequency of the fundamental wave of the first radiating element.

11. The communication terminal device according to claim 10, wherein the feeder circuit is configured to receive and output the communication signal in the low band including the resonant frequency of the fundamental wave of the first radiating element and a communication signal in a high band including the resonant frequency of the third harmonic of the first radiating element or the resonant frequency of the third harmonic of the second radiating element with the transformer.

12. The communication terminal device according to claim 10, wherein a self-inductance of the second coil is larger than a self-inductance of the first coil.

13. The communication terminal device according to claim 10, wherein a resonant frequency of a third harmonic of the second radiating element with the transformer is set at a value between the resonant frequency of the fundamental wave of the first radiating element and a resonant frequency of a third harmonic of the first radiating element.

14. A communication terminal device comprising:

the antenna coupling element according to claim 1;

the feeder circuit;

the first radiating element;

the second radiating element; a third radiating element; and a diplexer; wherein the diplexer includes a feeding port, a first antenna port, and a second antenna port;

the feeder circuit is connected to the feeding port;

the first radiating element is connected to the first antenna port;

the second radiating element is coupled to the first radiating element with the antenna coupling element disposed therebetween; and the third radiating element is connected to the second antenna port.

15. The communication terminal device according to claim 14, wherein the resonant frequency of the fundamental wave of the first radiating element is within a frequency range not less than about 1.71 GHz and not greater than about 2.69 GHz.

16. The communication terminal device according to claim 14, wherein a self-inductance of the second coil is larger than a self-inductance of the first coil.

17. The communication terminal device according to claim 14, wherein a resonant frequency of a third harmonic of the second radiating element with the transformer is set at a value between the resonant frequency of the fundamental wave of the first radiating element and a resonant frequency of a third harmonic of the first radiating element.

18. The antenna coupling element according to claim 1, further comprising:

a chip component on which a first radiating element connection terminal, a second connection terminal, a ground connection terminal, and a second radiating element connection terminal are disposed; wherein the first radiating element connection terminal is connected to the first radiating element;

the ground connection terminal is connected to ground;

the second radiating element connection terminal is connected to the second radiating element; and the second connection terminal is connected to the feeder circuit.

19. The antenna coupling element according to claim 1, further comprising:

a chip component on which a first radiating element connection terminal, a second connection terminal, a ground connection terminal, and a second radiating element connection terminal are disposed; wherein the first radiating element connection terminal is connected to the first radiating element;

the ground connection terminal is connected to ground;

the second radiating element connection terminal is connected to the second radiating element; and the second connection terminal is connected to ground.

* * * * *